(12) United States Patent
Akiyama

(10) Patent No.: US 7,494,225 B2
(45) Date of Patent: Feb. 24, 2009

(54) PROJECTOR INCLUDING AN ILLUMINATION DEVICE WITH A LIGHT CUT-OFF MEMBER AND ROTATING PRISM

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 451 days.

(21) Appl. No.: 11/328,168

(22) Filed: Jan. 10, 2006

(65) Prior Publication Data

US 2006/0187418 A1 Aug. 24, 2006

(30) Foreign Application Priority Data

Feb. 24, 2005 (JP) ............................. 2005-048628

(51) Int. Cl.
*G03B 21/00* (2006.01)
*G03B 21/28* (2006.01)

(52) U.S. Cl. .......................................... 353/33; 353/98
(58) Field of Classification Search .................. 353/33, 353/97, 81, 31, 20, 98; 349/5, 7–9; 359/495–497; 362/307–309, 326
See application file for complete search history.

(56) References Cited

U.S. PATENT DOCUMENTS

| | | | | |
|---|---|---|---|---|
| 5,528,318 A | * | 6/1996 | Janssen | 348/756 |
| 5,865,521 A | * | 2/1999 | Hashizume et al. | 353/38 |
| 6,755,538 B2 | * | 6/2004 | Sugawara | 353/97 |
| 2004/0257812 A1 | * | 12/2004 | Fujisawa | 362/263 |
| 2006/0007521 A1 | * | 1/2006 | Akiyama | 359/290 |
| 2006/0164601 A1 | * | 7/2006 | Akiyama | 353/33 |

FOREIGN PATENT DOCUMENTS

JP A 2002-148712 5/2002

OTHER PUBLICATIONS

Taiichiro Kurita, "Picture Quality of Hold Type Display for Moving Images", Technical Report of IEICE, EID99-10, pp. 55-60, with translations.

* cited by examiner

*Primary Examiner*—Hung Henry Nguyen
(74) *Attorney, Agent, or Firm*—Oliff & Berridge, PLC

(57) ABSTRACT

A projector includes an illumination device, an electro-optic modulator, a projection optical system, a light source device having an ellipsoidal reflector, a light emitting tube, a collimator lens, a first lens array having plural first small lenses for dividing an illumination beam emitted from the light source device into plural partial beams, and a second lens array having plural second small lenses corresponding to the plural first small lenses of the first lens array. The light illumination device also includes a light cut-off member arranged in a position which is optically conjugate with the plural first small lenses and the elector-optic modulator between the illumination device and the electro-optic modulator, and has a predetermined opening part for adjusting the sectional shape of the illumination beam. The light illumination device further provides a rotating prism, which is arranged on the electro-optic modulator side of the light cut-off member, and scans the illumination beam from the light cut-off member, in synchronization with a frame rate of the electro-optic modulator.

10 Claims, 10 Drawing Sheets

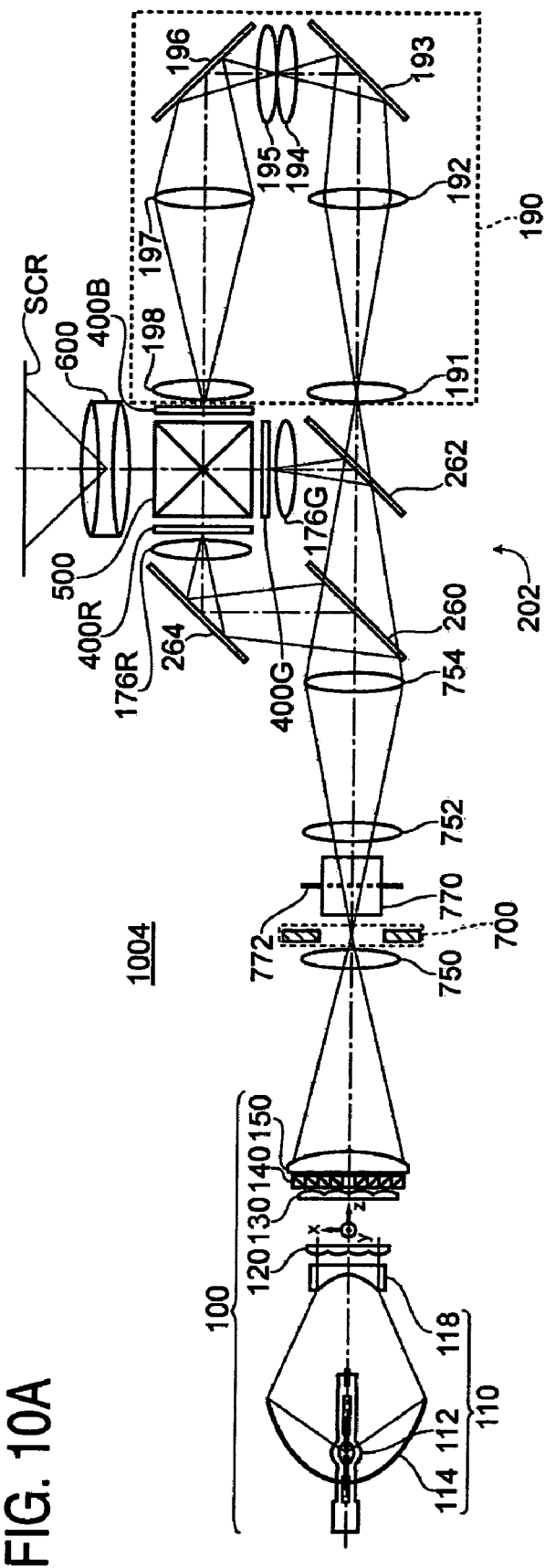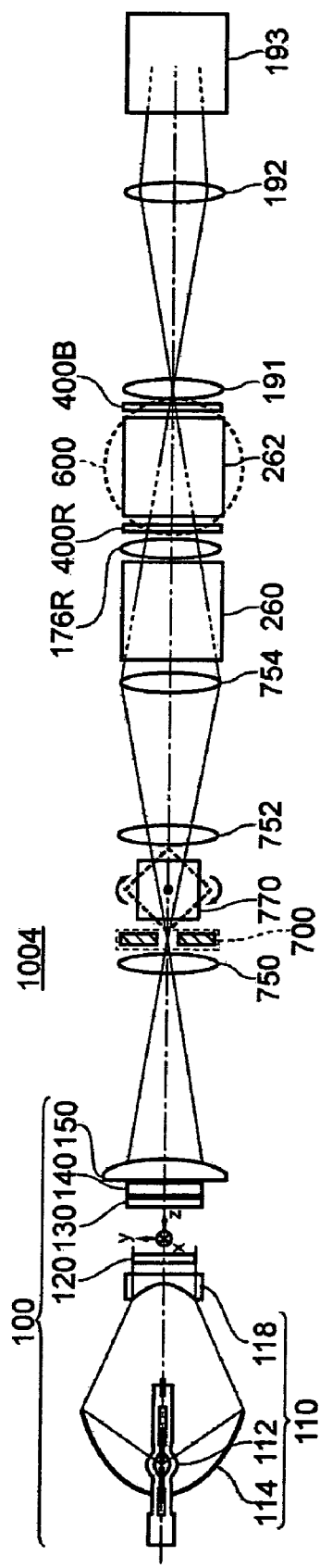
FIG. 10A
FIG. 10B

RELATED ART FIG. 12A
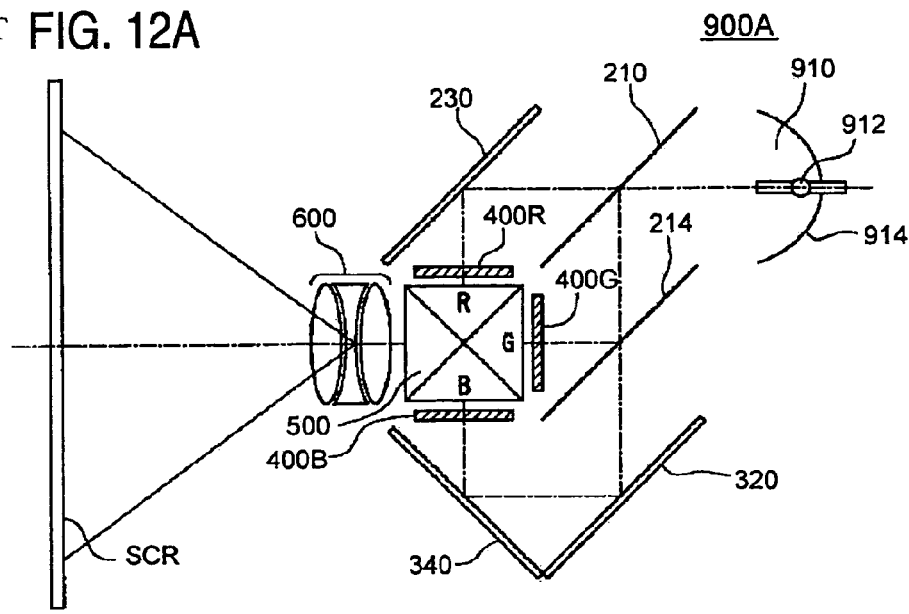
RELATED ART FIG. 12B
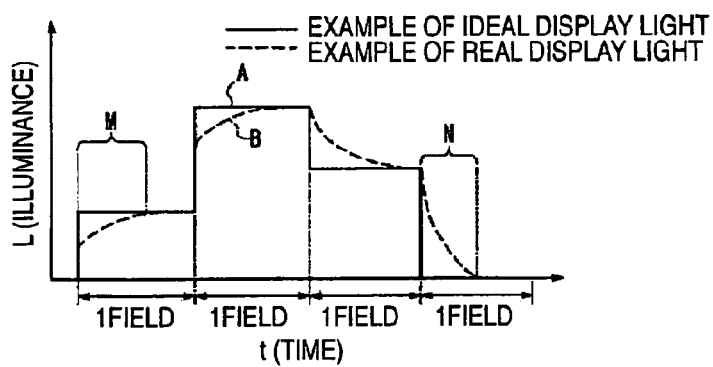
RELATED ART FIG. 12C
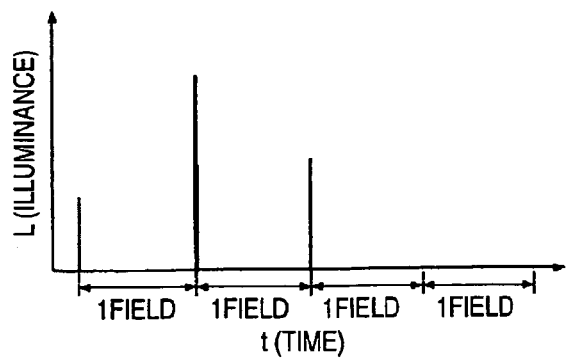

RELATED ART FIG. 13A
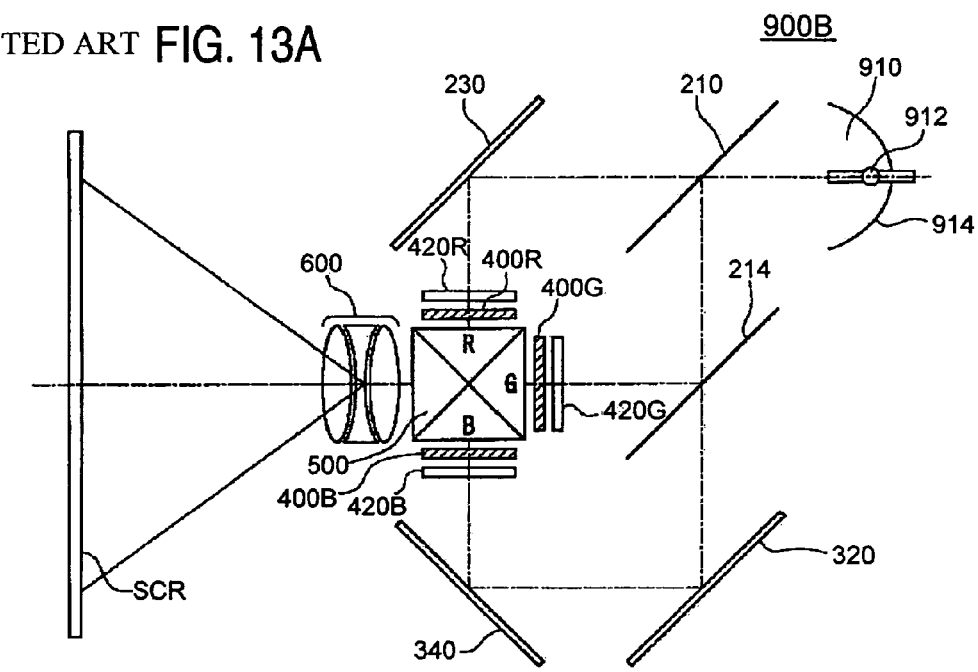
RELATED ART FIG. 13B
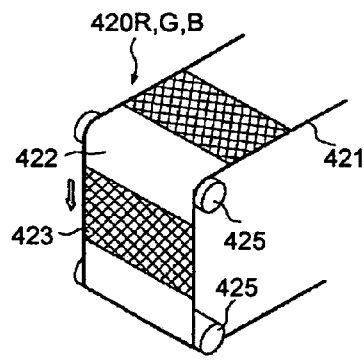
FIG. 13C RELATED ART
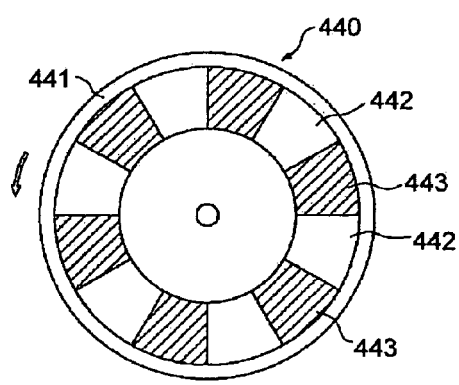

PROJECTOR INCLUDING AN ILLUMINATION DEVICE WITH A LIGHT CUT-OFF MEMBER AND ROTATING PRISM

BACKGROUND

1. Technical Field

The present invention relates to a projector.

2. Related Art

FIGS. 12A to 12C are diagrams for explaining a related projector 900A. FIG. 12A is a diagram showing an optical system of the related projector 900A, and FIGS. 12B and 12C are diagrams for explaining problems in such the related projector 900A.

This projector 900A is a hold-type display apparatus, in which liquid crystal devices 400R, 400G and 400B used as an electro-optical modulators have luminance characteristics as shown in FIG. 12B. Therefore, the projector 900A has a problem that smooth dynamic picture display cannot be obtained because of a so-called persistence of vision, which is different from the case of a CRT which is an impulse-type display device having luminance characteristics as shown in FIG. 12C (regarding this persistence of vision, refer to, for example, "Image Quality of Dynamic Picture Display in Hold-type Display" (Technical Report by The Institute of Electronics, Information and Communication Engineers, EID 99-10, Page 55 to 60 (1999-06)).

FIGS. 13A to 13C are diagrams for explaining another related projector 900B. FIG. 13A is a diagram showing an optical system of another related projector 900B, and FIGS. 13B and 13C are diagrams showing an optical shutter used in the projector 900B.

In this projector 900B, as shown in FIG. 13A, on the light incident sides of liquid crystal devices 400R, 400G and 400B, optical shutters 420R, 420G and 420B are arranged thereby to cut off light intermittently, so that the above problem is solved. Namely, persistence of vision is softened, and the smooth dynamic picture display of good quality can be obtained (refer to, for example, JP-A-2002-148712 (FIGS. 1 to 7)).

However, in such the related projector, there is a problem in which since the light is intermittently cut off by the optical shutter, efficiency of light utilization lowers greatly.

SUMMARY

An advantage of some aspects of the invention is to provide a projector in which efficiency of light utilization does not lower greatly even in case that smooth dynamic picture display of good quality is obtained.

A projector according to an aspect of the invention comprises an illumination device, an electro-optic modulator that modulates an illumination beam from the illumination device according to image information, and a projection optical system that projects the light modulated by the electro-optic modulator. The illumination device includes a light source device having an ellipsoidal reflector, a light emitting tube having a center of light emission near a first focus of the ellipsoidal reflector, and a collimator lens that makes the light emitted from the light emitting tube and reflected by the ellipsoidal reflector into a nearly parallel beam; a first lens array having plural first small lenses for dividing an illumination beam emitted from the light source device into plural partial beams; a second lens array having plural second small lenses corresponding to the plural first small lenses of the first lens array; and a superposition lens for superposing the partial beams emitted from the plural second small lenses in an area to be illuminated. Herein, each first small lens in the first lens array has a plane shape compressed in one direction which is either longitudinal or lateral direction in the image forming area of the electro-optic modulator so as to make the illumination beam emitted from the illumination device into an illumination beam having such the sectional shape as to illuminate a part of an image forming area in the one direction, and to illuminate the whole of the image forming area in the other direction,; a light cut-off member is arranged in a position which is optically conjugate with the plural first small lenses and the elector-optic modulator between the illumination device and the electro-optic modulator, and has a predetermined opening part for adjusting the sectional shape of the illumination beam; a rotating prism is further provided, which is arranged on the electro-optic modulator side of the light cut-off member, and scans the illumination beam from the light cut-off member, in synchronization with a frame rate of the electro-optic modulator, on the image forming area of the electro-optic modulator in the one direction; and the width along the one direction in the central portion in the other direction of the opening part is narrower than each width along the one direction at both ends in the other direction of the opening part.

Thus, the projector according to the aspect of the invention can scan the illumination beam having such the sectional shape as to illuminate a part of the image forming area in the one direction either longitudinal or lateral direction in the image forming area of the electro-optic modulator, and to illuminate the whole of the image forming area in the other direction (namely, the sectional shape compressed in the one direction) in synchronization with the frame rate of the electro-optic modulator, on the image forming area along the one direction. Therefore, in the image forming area of the electro-optic modulator, the illumination area and the non-illumination area come to be scrolled alternately in order. In result, persistence of vision is softened, and smooth dynamic picture display of good quality is obtained by this projector.

Further, in the projector according to the aspect of the invention, the illumination beam having the sectional shape compressed in the one direction is realized by using the first lens array in which a plane shape of the first small lens is compressed in the one direction. Therefore, the illumination beam emitted from the light source device can be guided to the image forming area of the electro-optic modulator without uselessness, which is different from the case in which the optical shutter is used. Thus, efficiency of light utilization does not lower greatly.

Therefore, in this projector according to the aspect of the invention, even in case the smooth dynamic picture display of good quality is obtained, the efficiency of light utilization does not lower greatly.

In the light source device having the light emitting tube, the ellipsoidal reflector, and the collimator lens, a part of the light emitted from the light emitting tube and reflected by the ellipsoidal reflector is intercepted by the light emitting tube itself (tube sphere portion or seal portion). This is remarkable particularly in case that the light emitting tube is a super-high pressure mercury-vapor lamp for high-intensity illumination. In result, a shadow is produced in the center portion of the illumination beam on the first lens array (refer to FIG. 3B), and it is difficult to completely uniformize in-plane illuminance distribution on the image forming area of the electro-optic modulator even by a light uniformizing optical system having the first lens array, the second lens array and the superposition lens (refer to FIG. 4). Therefore, a difference in illuminance is produced on the image forming area (each illuminance at both ends in one direction is lower than illuminance in the center portion in one direction), so that it is difficult to obtain the uniform in-plane display characteristics on a projection surface (refer to FIG. 5)

However, since the projector according to the aspect of the invention includes the light cut-off member having the above opening part, each width of the illumination beam at the both ends in one direction becomes larger than that in the center portion in one direction on the area to be illuminated. Therefore, by scanning such the illumination beam in the other direction, the difference in illuminance in the image forming area comes to be reduced, viewed from time average, so that the uniform in-plane display characteristics can be obtained on the projection surface.

A projector according to another aspect of the invention comprises an illumination device, an electro-optic modulator that modulates an illumination beam from the illumination system according to image information, and a projection optical system that projects the light modulated by the electro-optic modulator. The illumination device includes a light source device having an ellipsoidal reflector, and a light emitting tube having a center of light emission near a focus of the ellipsoidal reflector; a first lens array having plural first small lenses for dividing an illumination beam emitted from the light source device into plural partial beams; a second lens array having plural second small lenses corresponding to the plural first small lenses of the first lens array; and a superposition lens for superposing the partial beams emitted from the plural second small lenses in an area to be illuminated. Herein, each first small lens in the first lens array has, so as to make the illumination beam emitted from the illumination system into an illumination beam having such the sectional shape as to illuminate a part of an image forming area in one direction which is either longitudinal or lateral direction in the image forming area of the electro-optic modulator, and to illuminate the whole of the image forming area in the other direction, the plane shape compressed in the one direction; a light cut-off member is arranged in a position which is optically conjugate with the plural first small lenses and the elector-optic modulator between the illumination device and the electro-optic modulator, and has a predetermined opening part for adjusting the sectional shape of the illumination beam; a rotating prism is further provided, which is arranged on the electro-optic modulator side of the light cut-off member, and scans the illumination beam from the light cut-off member, in synchronization with a frame rate of the electro-optic modulator, on the image forming area of the electro-optic modulator along the one direction; and the width along the one direction in the central portion in the other direction of the opening part is narrower than each width along the one direction at both ends in the other direction of the opening part.

The projector according to another aspect of the invention is different from the above projector according to the first aspect of the invention in constitution of the light source device. However, since the projector according to another aspect of the invention includes the light cut-off member having the above opening part, similarly to the case of the projector according to the first aspect of the invention, each width of the illumination beam at the both ends in one direction becomes larger than that in the center portion in one direction on the area to be illuminated. Therefore, by scanning such the illumination beam in the one direction, the difference in illuminance in the image forming area comes to be reduced, viewed from time average, so that the uniform in-plane display characteristics can be obtained on the projection surface.

In the projector according to the first or another aspect of the invention, it is preferable that the light emitting tube is provided with an auxiliary mirror that reflects the light emitted from the light emitting tube to the side of the area to be illuminated, toward the light emitting tube.

By such the constitution, the light emitted from the light emitting tube to the side of the area to be illuminated is reflected toward the light emitting tube. Therefore, it is not necessary to set the size of the ellipsoidal reflector or the paraboloidal reflector to such a size as to cover the end portion on the side of the area to be illuminated of the light emitting tube, so that the size of the ellipsoidal reflector or the paraboloidal reflector can be reduced, and the size of the projector can be reduced.

In the projector in which the auxiliary mirror is provided for the light emitting tube, a part of the light emitted from the light emitting tube and reflected by the ellipsoidal reflector or the paraboloidal reflector is intercepted also by the auxiliary mirror. Therefore, it is further difficult to uniformize the in-plane illuminance distribution on the image forming area of the electro-optic modulator. In result, on the image forming area, each illuminance at the both ends in one direction becomes lower, so that it becomes more difficult to obtain the uniform in-plane display characteristics on the projection surface.

However, since the projector according to the first aspect or another aspect of the invention includes the light cut-off member having the above opening part, the difference in illuminance in the area to be illuminated comes to be reduced, so that the uniform in-plane display characteristics can be obtained on the projection surface also in the projector in which the light emitting tube is provided with the auxiliary mirror.

In the projector according to the first aspect or another aspect of the invention, it is preferable that the light emitting tube is arranged on an illumination light axis of the illumination beam emitted from the light source device, and the plural first small lenses are arranged symmetrically with the up-and-down direction and the left-and-right direction so that the illumination light axis becomes a center axis.

Further, in the projector according to the first aspect or another aspect of the invention, it is preferable that: the light emitting tube is arranged on an illumination light axis of the illumination beam emitted from the light source device; and the plural first small lenses arranged in the central portion in the one direction are arranged in an even number of rows along the other direction. Further, "plural first small lenses arranged in the central portion in the one direction" means plural first small lenses in lines to which the first small lenses at the portion where the shadow of the light emitting tube is laid on the first lens array belong.

It is preferable that the projector according to the first aspect or another aspect of the invention comprises:
a color-separation and light-guide optical system that is arranged between the rotating prism and the electro-optic modulator, and separates the illumination beam from the rotating prism into plural color lights; the plural electro-optic modulators that modulate the plural color lights emitted from the color-separation and light-guide optical system according to image information corresponding to their color lights; and a cross dichroic prism which synthesizes their color lights modulated by the plural electro-optic modulators.

By such the constitution, even in case that the smooth dynamic picture display of good quality is obtained, the projector in which the efficiency of light utilization does not lower greatly can be used as a full color projector (for example, three-panel type) which is superior in image quality.

BRIEF DESCRIPTION OF THE DRAWINGS

The invention will be described with reference to accompanying drawings, wherein like numbers reference like elements.

FIGS. 10A and 10B are diagrams showing an optical system of a projector 1004 according to a third embodiment.

FIGS. 12A to 12C are diagrams for explaining a related projector 900A.

FIGS. 13A to 13C are diagrams for explaining another related projector 900B.

DESCRIPTION OF EXEMPLARY EMBODIMENTS

The projector of the invention will be described with reference to embodiments shown in drawings.

First Embodiment

Figure 1A:
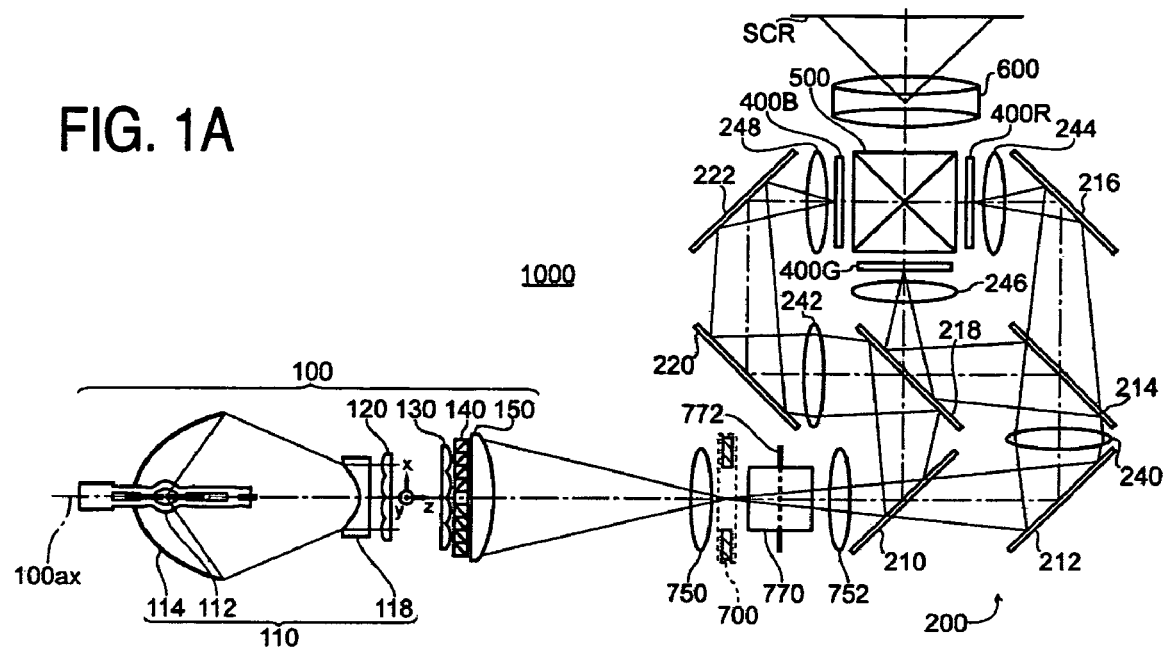
FIGS. 1A to 1E are diagrams for explaining a projector 1000 according to a first embodiment.
Figure 1B:
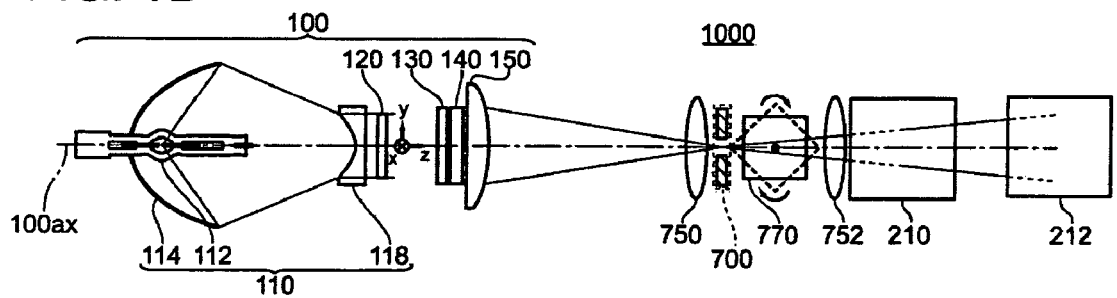
Figure 1C:
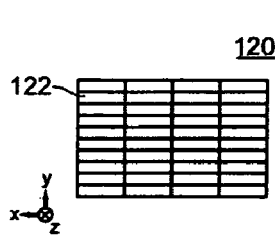
Figure 1D:
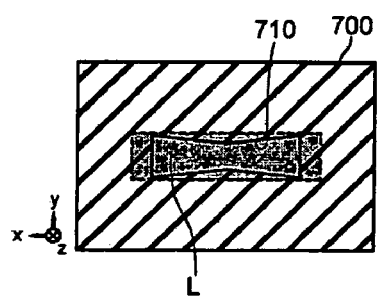
Figure 1E:
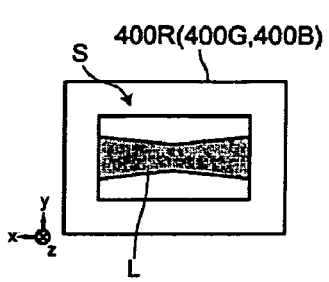

FIGS. 1A to 1E are diagrams for explaining a projector 1000 according to a first embodiment. FIG. 1A is a top view of an optical system in the projector 1000, FIG. 1B is a side view of the optical system in the projector 1000, FIG. 1C is a front view of a first lens array 120, FIG. 1D is a diagram showing an illumination state on a light cut-off member 700, and FIG. 1E is a diagram showing an illumination state on a liquid crystal device 400R.

In the following description, three directions orthogonal to one another are taken respectively as a z-axis direction (illumination light axis 100ax direction in FIG. 1A), an x-axis direction (direction parallel to the paper surface in FIG. 1A and orthogonal to the z-axis direction), and a y-axis direction (direction perpendicular to the paper surface in FIG. 1A and orthogonal to the z-axis direction).

The projector 1000 according to the first embodiment comprises, as shown in FIG. 1A, an illumination device 100; a color-separation and light-guide optical system 200 that separates an illumination beam from the illumination system 100 into three color lights of red light, green light and blue light and guides the lights to an area to be illuminated; three liquid crystal devices 400R, 400G and 400B as an electro-optic modulator that modulates the three color lights divided by the color-separation and light-guide optical system 200 according to their image information; a cross dichroic prism 500 which synthesizes the color lights modulated by these liquid crystal devices 400R, 400G and 400B; and a projection optical system 600 that projects the light synthesized by the cross dichotic prism 500 on a projection surface such as a screen SCR.

The illumination system 100 includes a light source device 110 that emits a nearly parallel illumination beam to the side of the area to be illuminated; a first lens array 120 having plural first small lenses 122 for dividing the illumination beam emitted from the light source device 110 into plural partial beams; a second lens array 130 having plural second small lenses 132 (not shown) corresponding to the plural first small lenses 122 of the first lens array 120; a polarization converting element 140 that converts the illumination beam emitted from the light source device 110 that is not uniform in polarization direction into one kind of linear polarized light; and a superposition lens 150 for superposing the partial beams emitted from the polarization converting element 140 in the area to be illuminated.

The light source device 110 includes an ellipsoidal reflector 114, a light emitting tube 112 having a center of light emission near a first focus of the ellipsoidal reflector 114, and a collimator lens 118 that converts the converging light reflected by the ellipsoidal reflector 114 into the nearly parallel light.

The light emitting tube 112 includes a tube-spherical portion, and pair of seal portions extending on both sides of the tube-spherical portion.

The ellipsoidal reflector 114 has a cylindrical neck-shaped portion that is inserted and fixed to one seal portion of the light emitting tube 112, and a reflection concave surface that reflects the light emitted from the light emitting tube 112 to a second focus position.

The collimator lens 118 is formed of a concave lens, and arranged on the side of the area to be illuminated of the ellipsoidal reflector 114. The collimator lens 118 is so constructed so as to make the light from the ellipsoidal reflector 114 into the nearly parallel light.

The first lens array 120 has a function of diving the light from the collimator lens 118 into plural partial beams as a beam diving optical element, and includes the plural first small lenses 122 that are arranged in the shape of a matrix in a plane orthogonal to the illumination optical axis 100ax.

The second lens array 130 is an optical element that converges the plural partial beams divided by the first lens array 120, and includes the plural second small lenses 132 that are arranged in the shape of a matrix in the plane orthogonal to the illumination light axis 100ax similarly to the first lens array 120.

The polarization converting element 140 makes the polarization directions of the partial beams divided by the first lens array 120 uniform, and emits each partial beam as one kind of linear polarized light.

The superposition lens 150 is an optical element, which converges the plural partial beams through the first lens array 120, the second lens array 130 and the polarization converting element 140, and superposes them on an image forming area S of each of the liquid crystal devices 400R, 400G and 400B.

The beam emitted from the superposition lens 150 is incident on a rotating prism 770. The rotating prism 770 is arranged between the illumination device 100 and the liquid crystal devices 400R, 400G and 400B, and has a function of scanning the illumination beam on the image forming area S in the longitudinal direction (y-axis direction) in synchronization with a frame rate of the liquid crystal device 400R, 400G, 400B. Field lenses 750 and 752 arranged in front and at the back of the rotating prism 770 are used in order to cause the light to effectively strike relay lenses 240 and 242 described later.

Figure 2A:
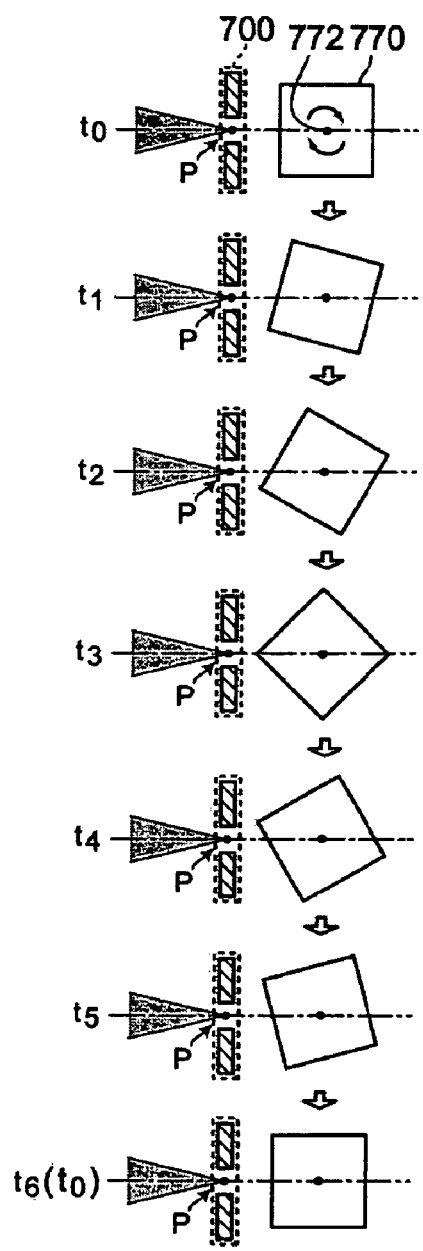
FIGS. 2A to 2C are diagrams showing a relation between rotation of a rotating prism 770 and an illumination state on an image forming area S.
Figure 2B:
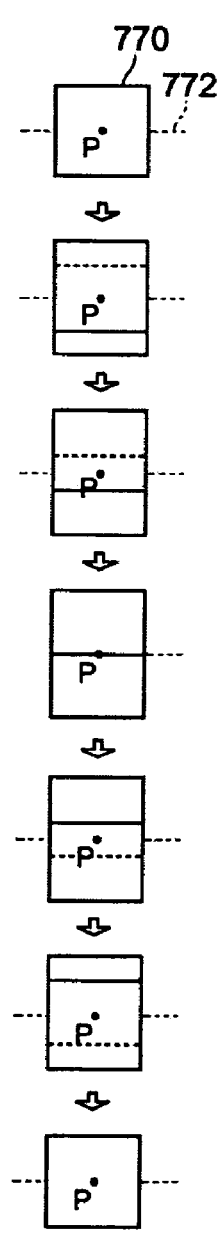
Figure 2C:
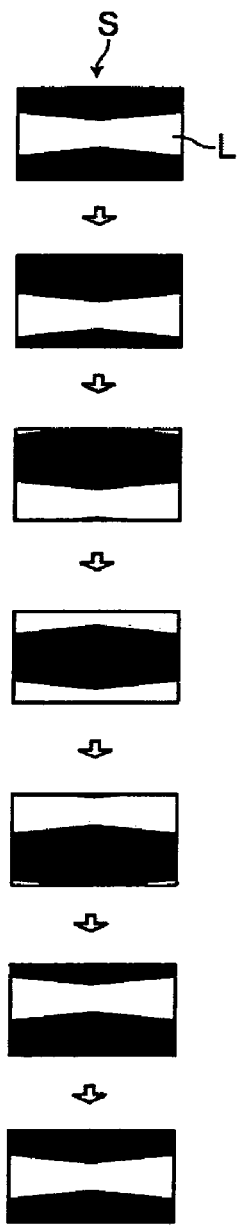

FIGS. 2A to 2C are diagrams showing a relation between rotation of the rotating prism 770 and an illumination state of the liquid crystal device 400R, 400G, 400B. FIG. 2A is a sectional view when the rotating prism 770 is seen along a rotation axis 772. FIG. 2B is a diagram when the rotating prism 770 is seen along the illumination optical axis 100ax. FIG. 2C is a diagram showing an illumination state of the illumination beam on the image forming area S of the liquid crystal device 400R, 400G, 400B.

The light emitted from an image P of an imaginary center point of the first lens array 120 on the illumination light axis 100ax, as shown in FIGS. 2A to 2C, when the rotating prism 770 rotates, receives the predetermined refraction by the light passing surface of the rotating prism 770. In result, in the image forming areas S of the liquid crystal devices 400R, 400G and 400B, the illumination area and the non-illumination area are scrolled in order.

The color-separation and light-guide optical system 200, as shown in FIG. 1A, has dichroic mirrors 210, 214; reflection mirrors 212, 216, 218, 220, 222; and relay lenses 240, 242. The color-separation and light-guide optical system 200 has a function of separating the illumination beam emitted from the rotating prism 770 into three color lights of red light, green light and blue light, and guiding their color lights respectively to the liquid crystal devices 400R, 400G and 400B to be illuminated. As the color separation and light-guide optical system 200, an equal optical path length optical system is used, which is equal in optical path length from the illumination device 100 to each liquid crystal device 400R, 400G, 400B.

The dichroic mirror 210 transmits a red light component and a green light component of the light emitted from the rotating prism 770, and reflects a blue light component. The blue light component reflected by the dichroic mirror 210, after being reflected by the reflection mirror 218 and reflected by the reflection mirrors 220, 222 through the relay lens 242, passes through a field lens 248 and reaches the liquid crystal device 400B for blue light. On the other hand, the red light component and the green light component that have passed through the dichroic mirror 210 are reflected by the reflection mirror 212 and pass through the relay lens 240. Here, among the red light component and the green light component emitted from the relay lens 240 passes through the dichroic mirror 214, the red light component is further reflected by the reflection mirror 216, passes through a field lens 244, and reaches the liquid crystal device 400R for red light. Further, the green light component reflected by the dichroic mirror 214 is further reflected by the reflection mirror 218, passes through a field lens 246 and reaches the liquid crystal device 400G for green light. The field lenses 244, 246, and 248 provided before the liquid crystal devices 400R, 400G and 400B along the optical path of each lights are used in order to convert each partial beam emitted from the second lens array 130 into a beam that is nearly parallel to each principal ray.

The liquid crystal devices 400R, 400G and 400B modulate the illumination beam according to the image information thereby to form a color image, and are targets of illumination for the illumination device 100. Between each field lens 244, 246, 248 and each liquid crystal device 400R, 400G, 400B, an incident side polarization plate is arranged, which is not shown. Between each liquid crystal device 400R, 400G, 400B and the cross dichroic prism 500, an exit side polarization plate is arranged. By these incident side polarization plates, liquid crystal devices 400R, 400G and 400B, and exit side polarization plates, each color light that is incident is modulated.

The liquid crystal device 400R, 400G, 400B is formed by sealing airtightly liquid crystal that is an electro-optic material in a pair of transparent glass substrates. The liquid crystal device 400R, 400G, 400B, with polysilicon TFT as a switching element, modulates the polarization direction of one kind of linear polarized light emitted from the incident side polarization plate in accordance with the given image signal.

As the liquid crystal device 400R, 400G, 400B, a liquid crystal device for wide vision is used, which has the plane shape of the rectangular shape of "longitudinal dimension in the y-axis direction:lateral dimension in the x-axis direction=9:16".

The cross dichroic prism 500 is an optical element that synthesizes optical images obtained by modulating the respective color lights emitted from the exit side polarization plates and forms a color image. This cross dichroic prism 500 has the square shape in plane, which is obtained by sticking four right-angle prisms on each other. On X-shaped interfaces formed by sticking the right-angle prisms on each other, dielectric multilayer films are formed. The dielectric multilayer film formed on one of the X-shaped interfaces reflects the red light, and the dielectric multilayer film formed on the other interface reflects the blue light. By these dielectric multilayer films, the red light and the blue light are bent and their traveling directions are matched with the traveling direction of the green light, whereby the three color lights are synthesized.

The color image emitted from the cross dichroic prism 500 is enlarged and projected by the projection optical system 600, and a large screen image is formed on a screen SCR.

The projector 1000 according to the first embodiment is characterized by the constitution of the first lens array 120 (and the constitution of the second lens array 130 corresponding to the first lens array), the scanning unit composed of the rotating prism 770, and the constitution of the light cut-off member 700.

The first lens array 120 and the light cut-off member 700 in the projector 1000 according to the first embodiment will be described below in detail.

1. First Lens Array The first lens array 120, as shown in FIG. 1C, has the structure in which the first small lenses 122 are arranged in four lines in the lateral direction and in 10 files in the longitudinal direction. Further, the first small lens 122 in the first lens array 120 has the plane shape of the rectangular shape of "longitudinal dimension in the y-axis direction:lateral dimension in the x-axis direction=1:4".

Namely, the first small lens 122 in the first lens array 120 has the plane shape of the rectangular shape of "longitudinal dimension in the y-axis direction:lateral dimension in the x-axis direction=1:4", which is compressed in the longitudinal direction (refer to FIG. 1D). This is because the illumination beam emitted from the illumination device 100 is made into an illumination beam having the sectional shape that illuminates the whole of the image forming area S in the lateral direction along the x-axis among the longitudinal and lateral directions in the image forming area S of each liquid crystal device 400R, 400G, 400B, and illuminates a part of about 50% of the image forming area S in the longitudinal direction along the y-axis.

2. Light Cut-Off Member

Figure 3A:
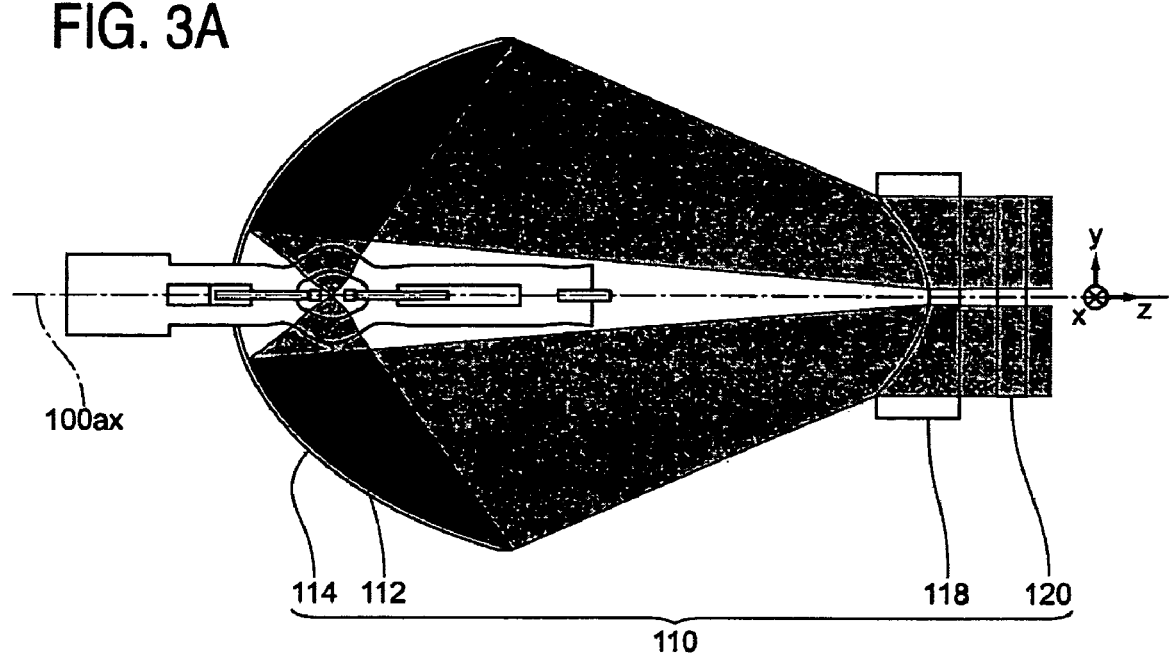
FIGS. 3A and 3B are diagrams for explaining a cause by which a difference in illuminance is produced on the image forming area S.
Figure 3B:
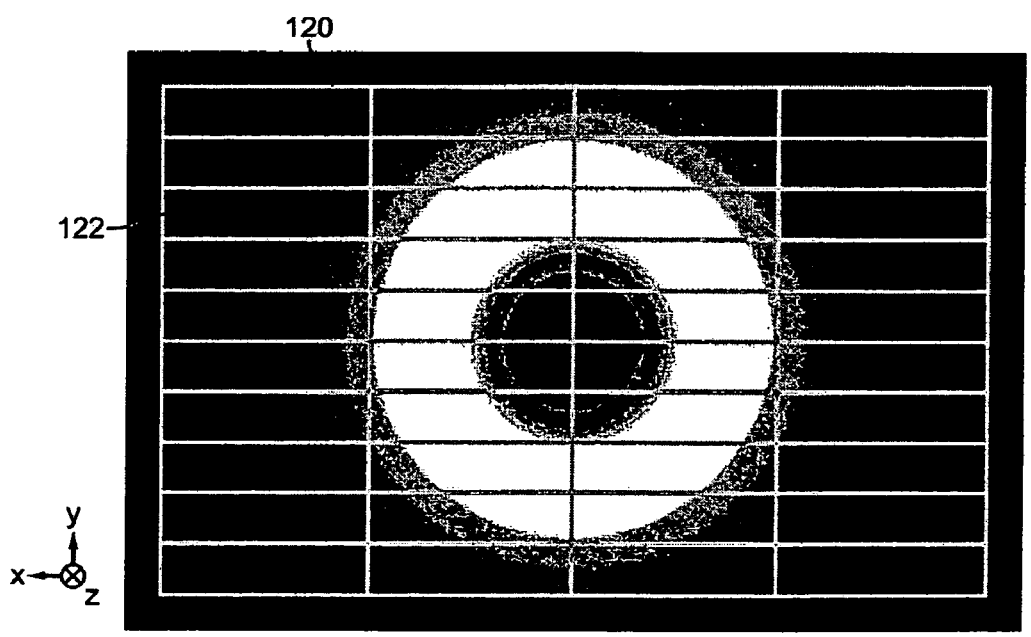

FIGS. 3A and 3B are diagrams for explaining a cause to cause difference in illuminance on the image forming area S. FIG. 3A is a diagram showing a locus of light from the light emitting tube, and FIG. 3B is a diagram showing an in-plane illuminance distribution of the illumination beam on the first lens array 120.

Figure 4A:
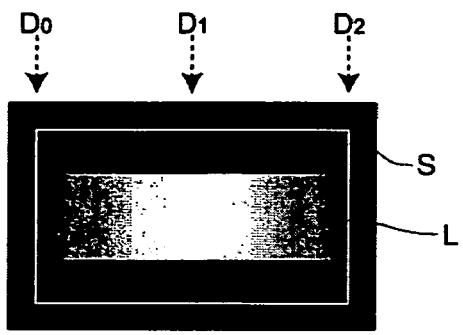
FIGS. 4A and 4B are diagrams showing an in-plane illuminance distribution on the image forming area S.
Figure 4B:
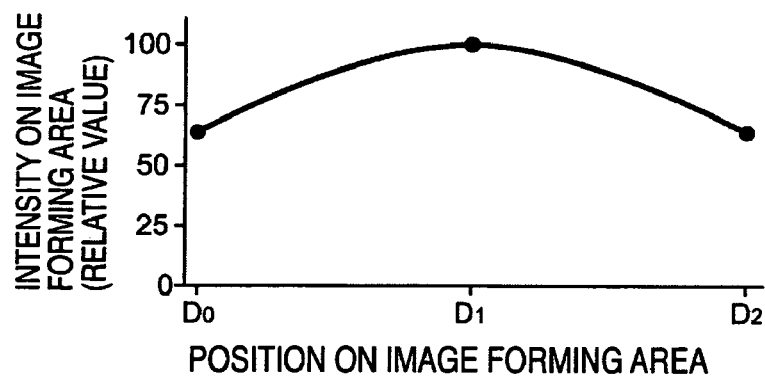

FIGS. 4A and 4B are diagrams showing an in-plane illuminance distribution on the image forming area S. FIG. 4A is a schematic diagram showing the in-plane illuminance distribution on the image forming area S, and FIG. 4B is a graph showing the in-plane illuminance distribution on the image forming area S.

Figure 5A:
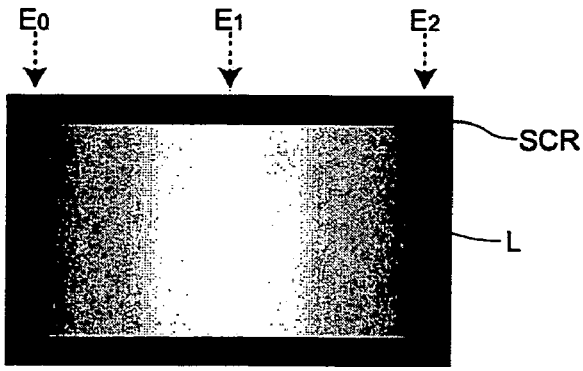
FIGS. 5A and 5B are diagrams showing a condition in which the difference in illuminance on the image forming area S deteriorates in-plane display characteristics on a screen SCR.
Figure 5B:
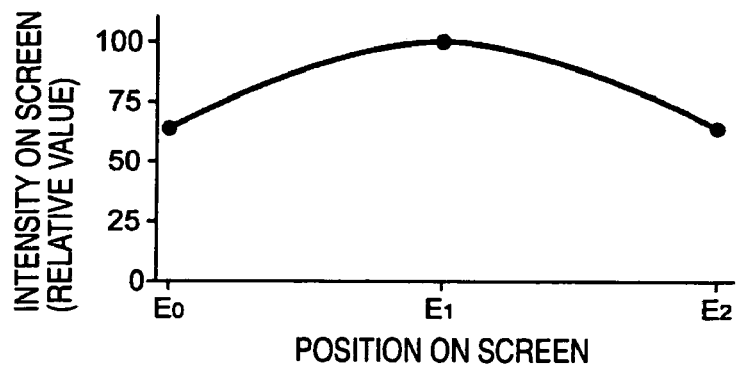

FIGS. 5A and 5B are diagrams showing a state where the illuminance difference on the image forming area S deteriorates in-plane display characteristics on the screen SCR. FIG. 5A is a schematic diagram showing an in-plane illuminance distribution on the screen SCR, and FIG. 5B is a graph showing the in-plane illuminance distribution on the screen SCR.

Figure 6A:
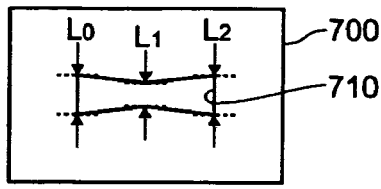
FIGS. 6A to 6C are diagrams for explaining an advantage of a projector 1000 according to the first embodiment.
Figure 6B:
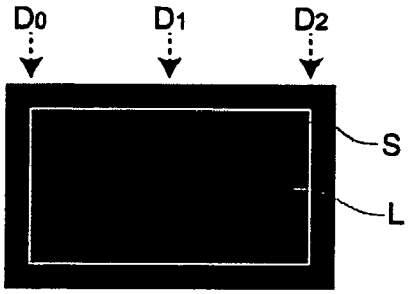
Figure 6C:
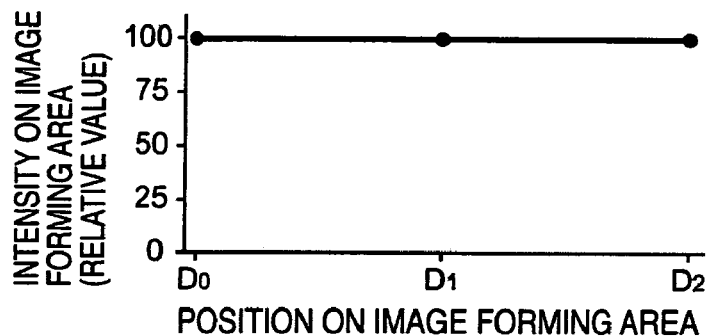

FIGS. 6A to 6C are diagrams for explaining an advantage of the projector 1000 according to the first embodiment. FIG. 6A is a diagram showing the plane shape of the light cut-off member 700, FIG. 6B is a schematic diagram showing an in-plane illuminance distribution on the image forming area S, and FIG. 6C is a graph showing the in-plane illuminance distribution on the image forming area S.

Figure 7A:
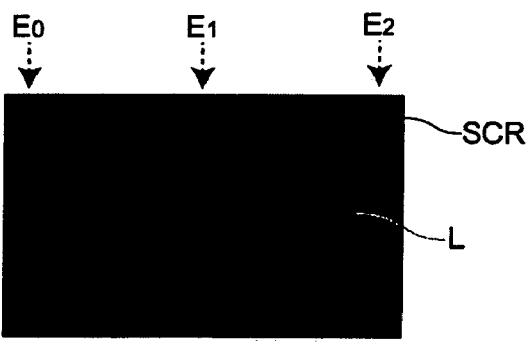
FIGS. 7A and 7B are diagrams for explaining an advantage of the projector 1000 according to the first embodiment.
Figure 7B:
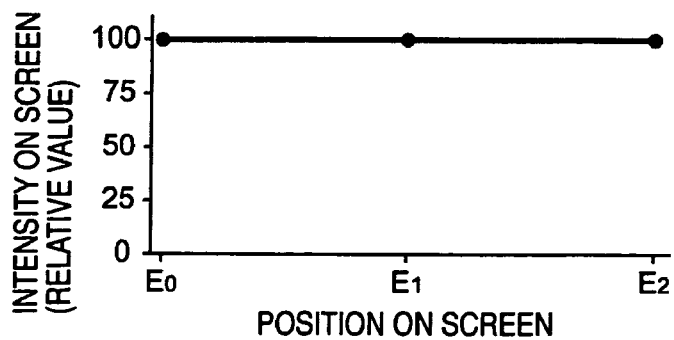

FIGS. 7A and 7B are diagrams for explaining an advantage of the projector 1000 according to the first embodiment. FIG. 7A is a schematic diagram showing an in-plane illuminance distribution on the screen SCR, and FIG. 7B is a graph showing the in-plane illuminance distribution on the screen SCR.

The light cut-off member 700, as shown in FIGS. 1A and 1B, is arranged in a position which is optically conjugate with each first small lens 122 and the liquid crystal device 400R, 400G, 400B between the illumination device 100 and the color-separation and light-guide optical system 200, and has a predetermined opening part 710 in order to adjust the sectional shape of the illumination beam.

In the opening part 710, as shown in FIG. 6A, the width $L_1$ along the y-axis in the center portion in the x-axis direction of the opening part 710 is formed more narrowly than each width $L_0$, $L_2$ along the y-axis direction at both ends in the x-axis direction of the opening part 710. Further, in the opening part 710, sides at both ends in the y-axis direction are linear.

The relative position relation between the light source device 110 and the first lens arrays 120 will be described.

The light emitting tube 112 of the light source device 110 is arranged so that its light emission center is located near a first focus of the ellipsoidal reflector 114. The ellipsoidal reflector 114 includes a rotating elliptical surface having the first focus and a second focus on the illumination optical axis 100ax that is a center axis of the illumination beam emitted from the light source device 110. The collimator lens 118 is a concave lens having a lens optical axis on the illumination optical axis 100ax.

In the projector 1000 according to the first embodiment, the light emitting tube 112 is arranged on the illumination optical axis 100ax. The plural first small lenses 122 arranged in the center portion of the first lens array 120 are arranged in four lines in the x-axis direction. Further, the plural first small lenses 122 of the first lens array 120 are arranged with the illumination optical axis 100ax as the center axis symmetrically with the up-and-down direction and the left-and-right direction.

Next, the illumination beam which is emitted from the light source device 110 and incident on the first lens array 120 will be described.

In the projector 1000 according to the first embodiment, as shown in FIG. 3A, a part of the light emitted from the light emitting tube 112 and reflected by the ellipsoidal reflector 114 is intercepted by the light emitting tube 112 itself (tube sphere portion or seal portion). As a result, as shown in FIG. 3B, a shadow is produced in the center portion of the illumination beam on the first lens array 120.

In case that such the shadow is produced on the first lens array 120, in each of the first small lenses 122 near the illumination optical axis 100ax of the plural first small lenses 122 of the first lens array 120, as shown in FIG. 3B, a shadow exists in one end side in the lateral direction (x-axis direction), so that only one end is lower in illuminance.

In case that the partial beams from the first lens array 120, having such the illuminance distribution are superposed on the image forming area S of the liquid crystal device 400R, 400G, 400B as they are, even by the light uniformizing optical system in the first embodiment, having the first lens array 120, the second lens array 130, and the superposition lens 150, it is difficult to uniformize completely the in-plane illuminance distribution on the image forming area S of the liquid crystal device 400R, 400G, 400B. As a result, as shown in FIG. 4A, on the image forming area S, each illuminance at the both ends in the x-axis direction becomes lower than the illuminance in the center portion in the x-axis direction, so that it is difficult to obtain the uniform in-plane display characteristics on the projection surface as shown in FIGS. 5A and 5B.

However, according to the projector 1000 in the first embodiment, since the light cut-off member 700 having the above opening part 710 is provided, as shown in FIG. 6B, on the image forming area S, each width of the illumination beam at the both ends $D_0$, $D_2$ in the x-axis direction becomes larger than the width of the illumination beam in the center portion $D_1$ in the x-axis direction. Therefore, by scanning such the illumination beam in the y-axis direction, as shown in FIG. 6C, the difference in illuminance on the image forming area S is reduced, seeing at time average, so that the uniform in-plane display characteristics can be obtained on the screen SCR as shown in FIGS. 7A and 7B.

According to the projector 1000 in the first embodiment, the illumination beam having the sectional shape compressed in the longitudinal direction is realized by using, as the first lens array 120, the lens array in which the plane shape of the first small lens 122 is compressed in the longitudinal direction. Therefore, the illumination beam emitted from the light source device 110 can be led to the image forming area S of the liquid crystal device 400R, 400G, 400B without uselessness, so that efficiency of light utilization does not lower greatly, which is different from the case where the optical shutter is used.

According to the projector 1000 in the first embodiment, the illumination beam having the sectional shape that illuminates the whole of the image forming area S in the lateral direction along the x-axis direction among the longitudinal and lateral directions in the image forming area S of the liquid crystal device 400R, 400G, 400B, and illuminates a part of the image forming area S in the longitudinal direction along the y-axis (that is, the sectional shape compressed in the longitudinal direction) can be scanned on the image forming area S in the Y-axis direction in synchronization with the frame rate of the liquid crystal device 400R, 400G, 400B. Therefore, in the image forming area S of the liquid crystal device 400R, 400G, 400B, the light illumination area and the light non-illumination area come to be scrolled in order. As a result, by this projector, the persistence of vision is softened, and the smooth dynamic picture display of good quality can be obtained.

Though the first lens array 120 and the light cut-off member 700 in the projector 1000 according to the first embodiment have been described above in detail, the projector 1000 according to the first embodiment has also the following characteristics.

In the projector 1000 according to the first embodiment, as the electro-optic modulator, the three liquid crystal devices 400R, 400G and 400B are provided, which modulate the three color lights emitted from the color-separation and light-guide optical system 200 according to the image information corresponding to their color lights. Further, the projector 1000 includes the color-separation and light-guide optical system 200 that is arranged between the rotating prism 770 and the liquid crystal devices 400R, 400G and 400B, and separates the illumination beam from the rotating prism 770 into three color lights to guide their color lights to the liquid crystal devices 400R, 400G and 400B; and the cross dichroic prism 500 that synthesizes the respective color lights modulated by the liquid crystal devices 400R, 400G and 400B.

Therefore, according to the projector 1000 in the first embodiment, even in case that the smooth dynamic picture display of good quality can be obtained, the efficiency of light utilization does not lower greatly, and a three-panel type full color projector of good image quality can be provided.

The projector 1000 according to the first embodiment further includes the polarization converting element 140 that makes the illumination beam from the light source device 110 into one kind of linear polarized light and emits the linear polarized light.

The polarization converting element 140 has a polarization separating layer which transmits one linear polarized component of polarization components included in the illumination beam from the light source device 110 directly and reflects the other linear polarized component in the perpendicular direction to the illumination optical axis 100$ax$; a reflection layer which reflects the other linear polarized component reflected by the polarization separating layer in the parallel direction to the illumination optical axis 100$ax$; and a phase plate which converts the illumination beam into either one linear polarized component that has passed through the polarization separating layer or the other linear polarized component reflected by the reflection layer.

Therefore, by the working of the polarization converting element 140, the illumination beam from the light source device 110 can be converted into one kind of linear polarized light having one polarization axis. Therefore, in case that the electro-optic modulator of the type which utilizes one kind of linear polarized light, such as the liquid crystal device is used as the electro-optic modulator like the case of the projector 1000 according to the first embodiment, the illumination beam from the light source device 110 can be effectively utilized.

In the projector 1000 according to the first embodiment, an anti-reflection film is formed on a light transmission surface of the rotating prism 770. Therefore, since the light transmissibility in the rotating prism 770 improves, the lowering of the efficiency of light utilization can be made minimum. Further, since stray light levels decrease, contrast improves.

Second Embodiment

Figure 8A:
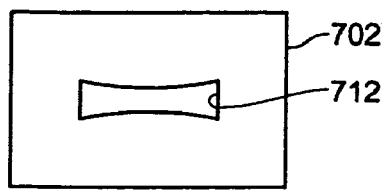
FIGS. 8A to 8B are diagrams for explaining an advantage of a projector 1002 according to a second embodiment.
Figure 8B:
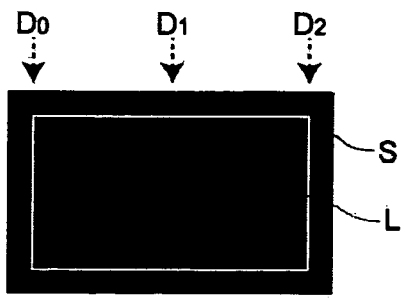
Figure 8C:
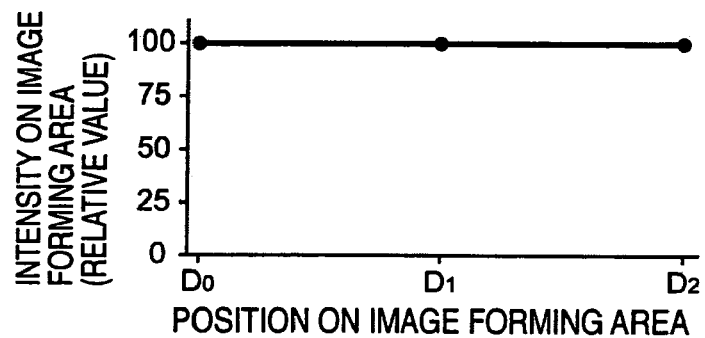

FIGS. 8A to 8B are diagrams for explaining an advantage of a projector 1002 according to a second embodiment. FIG. 8A is a diagram showing the plane shape of a light cut-off member 702, FIG. 8B is a schematic diagram showing an in-plane illuminance distribution on the image forming area S, and FIG. 8C is a graph showing the in-plane illuminance distribution on the image forming area S.

Figure 9A:
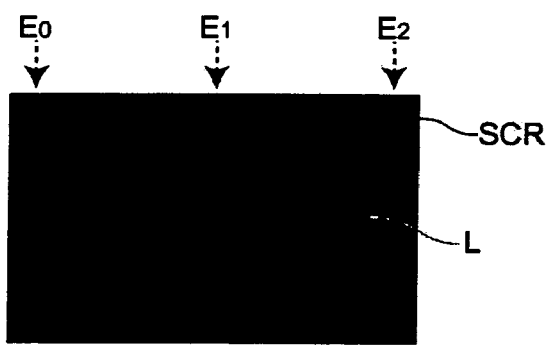
FIGS. 9A and 9B are diagrams for explaining an advantage of the projector 1002 according to a second embodiment.
Figure 9B:
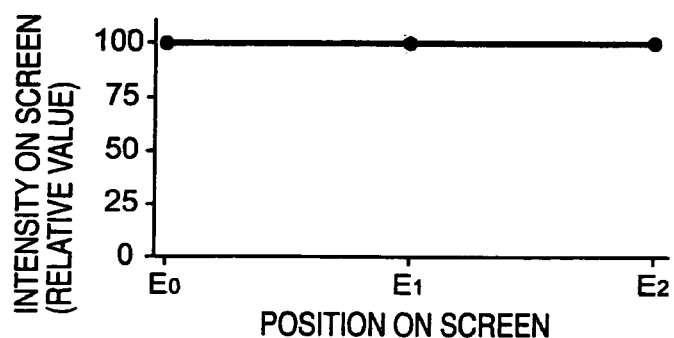

FIGS. 9A and 9B are diagrams for explaining an advantage of the projector 1002 according to the second embodiment. FIG. 9A is a schematic diagram showing an in-plane illuminance distribution on the screen SCR, and FIG. 9B is a graph showing the in-plane illuminance distribution on the screen SCR.

The projector 1002 (not shown) according to the second embodiment 2 has basically the constitution resemblant to that in the projector 1000 according to the first embodiment. However, as shown in FIG. 8A, the projector 1002 is different from the projector 1000 according to the first embodiment in constitution of the light cut-off member.

Namely, the projector 1002 according to the second embodiment includes, as the light cut-off member, a light cut-off member 702 having an opening part 712 in which sides at both ends in the y-axis direction are curved.

Thus, the projector 1002 according to the second embodiment is different from the projector 1000 according to the first embodiment in detailed constitution. However, as shown in FIG. 8A, as the projector 1002 includes the light cut-off member 702 in which the width along the y-axis direction in the center portion in the x-axis direction of the opening part 712 is narrower than each width along the y-axis direction at the both ends in the x-axis direction of the opening part 712, similarly to the case of the projector 1000 according to the first embodiment, each width of the illumination beam at the both ends $D_0$, $D_2$ in the x-axis direction becomes larger than the width of the illumination beam in the center portion $D_1$ in the x-axis direction on the image forming area S as shown in FIG. 8B. Therefore, by scanning such the illumination beam in the y-axis direction, as shown in FIG. 8C, the difference in illuminance on the image forming area S is reduced, seeing at time average, so that the uniform in-plane display characteristics can be obtained on the screen SCR as shown in FIGS. 9A and 9B.

Further, since the projector 1002 according to the second embodiment has the similar constitution to the constitution of the projector 1000 according to the first embodiment regarding other points, it has the similar advantage to that in case of the projector 1000 according to the first embodiment.

Third Embodiment

FIGS. 10A and 10B are diagram showing an optical system of a projector 1004 according to a third embodiment. FIG. 10A is a top view of the optical system in the projector 1004, and FIG. 10B is a side view of the optical system in the projector 1004.

The projector 1004 according to the third embodiment has basically the constitution resemblant to the constitution of the projector 1000 according to the first embodiment. However, as shown in FIG. 10A, the projector 1004 is different from the projector 1000 according to the first embodiment in constitution of the color-separation and light-guide optical system.

Namely, in the projector 1004 according to the third embodiment, as a color-separation and light-guide optical system 202, a double relay optical system 190 is used in order to make the scrolled directions of the light illumination area and the light non-illumination area the same on each liquid crystal device 400R, 400G, 400B.

The color-separation and light-guide optical system 202, as shown in FIG. 10A, dichroic mirrors 260, 262, a reflection mirror 264, and the double relay optical system 190. The double relay optical system 190 includes relay lenses 191, 192, 194, 195, 197; reflection mirrors 193, 196; and a field lens 198. Further, before the color-separation and light-guide optical system 202 alon the optical path, a relay lens 754 is arranged.

The dichroic mirror 260 reflects a red light component of the light emitted from a rotating prism 770, and transmits a green light component and a blue light component. The red light component reflected by the dichroic mirror 260, is reflected by the reflection mirror 264, passes through a field lens 176R and reaches the liquid crystal device 400R for red light.

Among the green light component and the blue light component, The green light component that have passed through the dichroic mirror 260 is reflected by the dichroic mirror 262, passes through a field lens 176G, and reaches the liquid crystal device 400G for green light. On the other hand, the blue light component that has passed through the dichroic mirror 260 passes through the dichroic mirror 262 and the double relay optical system 190, and reaches the liquid crystal device 400B for blue light. The field lenses 176R, 176G and 198 provided before the liquid crystal devices 400R, 400G and 400B along the optical path of each color lights are used in order to convert each partial beam emitted from a second lens array 130 into a beam that is nearly parallel to each principal ray.

Here, the reason why the double relay optical system 190 is provided in the optical path of blue light is: to prevent lowering of efficiency of light utilization due to light dispersion produced since the length of the optical path of blue light is longer than that of other color light; and to make the scrolled direction of the light illumination area and the light non-illumination area on each liquid crystal device 400R, 400G, and 400B the same direction. Further, though the double relay optical system 190 is used on the optical path of blue light of three color lights in the projector 1004 according to the third embodiment, such the double relay optical system may be used on the optical path of another color light such as the red light.

Thus, the projector 1004 according to the third embodiment is different from the projector 1000 according to the first embodiment in constitution of the color-separation and light-guide optical system. However, the projector 1004 includes a light cut-off member 700 having the similar opening part 710 to that in the projector 1000 according to the first embodiment. Therefore, similarly to the case of the projector 1000 according to the first embodiment, on the image forming area S, each width of the illumination beam at the both ends in the x-axis direction becomes larger than the width of the illumination beam in the center portion in the x-axis direction. Therefore, by scanning such the illumination beam in the y-axis direction, the difference in illuminance on the image forming area S is reduced, so that the uniform in-plane display characteristics can be obtained on the screen SCR.

Further, since the projector 1004 according to the third embodiment has the similar constitution to the constitution of the projector 1000 according to the first embodiment regarding other points, it has the similar advantage to that in case of the projector 1000 according to the first embodiment.

Fourth Embodiment

Figure 11A:
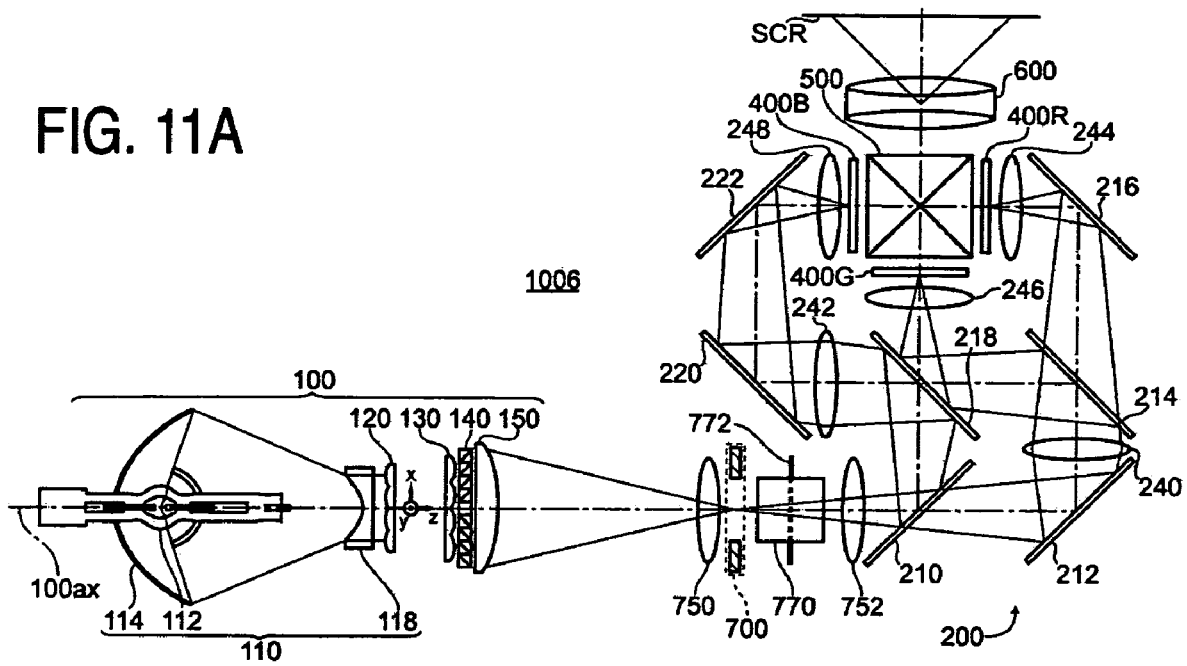
FIGS. 11A to 11E are diagrams showing an optical system of a projector 1006 according to a fourth embodiment.
Figure 11B:
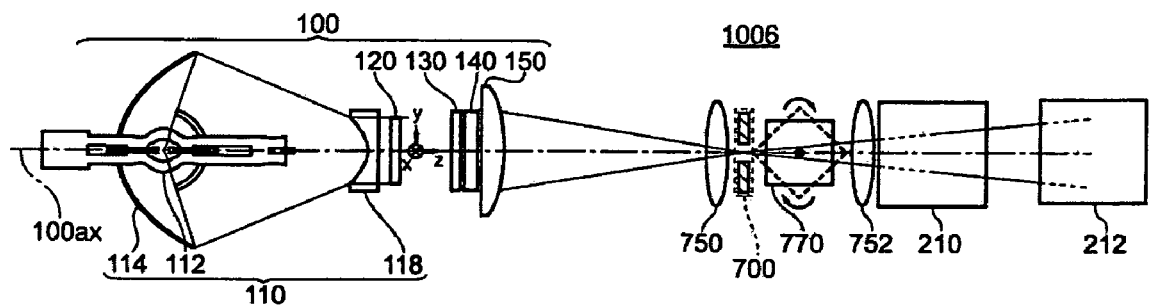
Figure 11C:
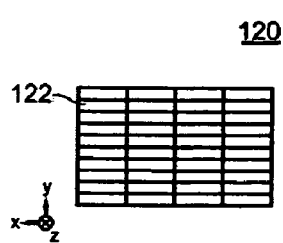
Figure 11D:
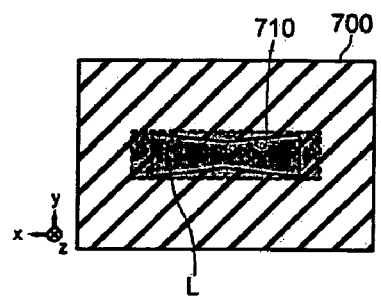
Figure 11E:
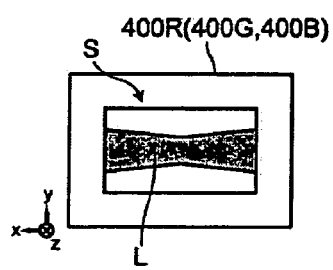

FIGS. 11A to 11E are diagrams showing an optical system of a projector 1006 according to a fourth embodiment. FIG. 11A is a top view of the optical system in the projector 1006, and FIG. 11B is a side view of the optical system in the projector 1006. FIG. 11C is a front view of a first lens array 120, FIG. 11D is a diagram showing an illumination state on a light cut-off member 700, and FIG. 11E is a diagram showing an illumination state on a liquid crystal device 400R.

The projector 1006 according to the fourth embodiment has basically the constitution resemblant to the constitution of the projector 1000 according to the first embodiment. However, as shown in FIGS. 11A and 11B, the projector 1006 is different from the projector 1000 according to the first embodiment in that an auxiliary mirror is provided for a light emitting tube. Namely, in the projector 1006 according to the fourth embodiment, for a light emitting tube 112, an auxiliary mirror 116 is provided, which reflects the light emitted from the light emitting tube 112 to the side of area to be illuminated, toward the light emitting tube 112.

Thus, the projector 1006 according to the fourth embodiment is different from the projector 1000 according to the first embodiment in that the auxiliary mirror is provided for the light emitting tube. However, since the projector 1006 has the similar constitution to the constitution of the projector 1000 according to the first embodiment regarding other points, it has the similar advantage to that in case of the projector 1000 according to the first embodiment.

Further, according to the projector 1006 in the fourth embodiment, since the light emitted from the light emitting tube 112 to the side of the area to be illuminated is reflected toward the light emitting tube 112, it is not necessary to set the size of an ellipsoidal reflector 114 to such a size as to cover the end portion on the side of the area to be illuminated of the light emitting tube 112. Therefore, the size of the ellipsoidal reflector 114 can be reduced, so that the size of the projector can be reduced.

In the projector 1006 according to the fourth embodiment, a part of the light emitted from the light emitting tube 112 and reflected by the ellipsoidal reflector 114 is intercepted also by the auxiliary mirror 116. Therefore, it is thought that it is more difficult to uniformize an in-plane illuminance distribution on the image forming area S of each liquid crystal device 400R, 400G, 400B.

However, according to the projector 1006 in the fourth embodiment, since the light cut-off member 700 having the above opening part 710 is provided, the illuminance difference in the image forming area S is reduced, so that the uniform in-plane display characteristics can be obtained on the screen SCR also in the projector in which the auxiliary mirror 116 is provided for the light emitting tube 112.

Though the projector of the invention has been described above with reference to each of the above embodiments, the invention is not limited to each of the above embodiments but the invention can be embodied in several forms without departing from the subject matter of the invention. For example, the following modifications are possible.

1. In the projectors 1000 to 1006 in the above embodiments, as the light source 110, there is used the light source including the ellipsoidal reflector 114, the light emitting tube 112 having a center of light emission near the first focus of the ellipsoidal reflector 114, and the collimator lens 118 that makes the light emitted from the light emitting tube 112 and reflected by the ellipsoidal reflector 114 into nearly parallel light. However, the invention is not limited to this, but a light source including an paraboloidal reflector and an light emitting tube having a center of light emission near a focus of the paraboloidal reflector can be also used.

2. In the projectors 1000 to 1006 in the above embodiments, as the plane shape of the first small lens 122 of the first lens array 120, the rectangular shape of "longitudinal dimension:lateral dimension=1:4" is used. However, the invention is not limited to this. For example, the rectangular shape of "longitudinal dimension:lateral dimension=9:32" or the rectangular shape of "longitudinal dimension:lateral dimension=3:8" can be preferably used.

3. In each of the above embodiments, the projector using the three liquid crystal devices 400R, 400G and 400B has been described as an example. However, the invention is not limited to this, but it can be applied also to a projector using one, two, or four and more liquid crystal devices.

4. In the projectors 1000 to 1006 in the above embodiments, as the electro-optic modulator, the liquid crystal device is used. However, the invention is not limited to this. As long as the electro-optic modulator generally modulates the incident light according to image information, a micromirror type optical modulator may be utilized. As the micromirror type optical modulator, for example, a DMD (Digital Micromirror Device) (Trade Mark by Texas Instruments Inc.) can be used.

5. The invention can be applied to a front projection type projector which projects a projection image from an observation side, and also to a rear projection type projector which projects a projection image from the opposite side to the observation side.

The entire disclosure of Japanese Patent Application No. 2005-048628, filed Feb. 24, 2005 is expressly incorporated by reference herein.

What is claimed is:

1. A projector comprising:
an illumination device including:
    a light source device having an ellipsoidal reflector, a light emitting tube having a center of light emission near a first focus of the ellipsoidal reflector, and a collimator lens that collimates the light emitted from the light emitting tube and reflected by the ellipsoidal reflector into a nearly parallel beam,
    a first lens array having plural first small lenses for dividing an illumination beam emitted from the light source device into plural partial beams,
    a second lens array having plural second small lenses corresponding to the plural first small lenses of the first lens array, and
    a superposition lens for superposing the partial beams emitted from the plural second small lenses in an area to be illuminated;
an electro-optic modulator that modulates the illumination beam from the illumination device according to image information, each first small lens in the first lens array has a plane shape compressed in a direction which is either longitudinal or lateral direction forming the illumination beam emitted from the illuminating device into an illumination beam having a sectional shape as to illuminate a part of an image forming area in a first direction in the image forming area of the electro-optic modulator, and to illuminate the whole of the image forming area in a second direction;
a light cut-off member that is arranged in a position which is optically conjugate with the plural first small lenses and the elector-optic modulator between the illumination device and the electro-optic modulator, and has a predetermined opening part for adjusting the sectional shape of the illumination beam, the width of the predetermined opening part at a central portion being narrower than the width at both ends of the opening part;
a rotating prism that is arranged on the electro-optic modulator side of the light cut-off member, and scans the illumination beam from the light cut-off member, in synchronization with a frame rate of the electro-optic modulator, on the image forming area of the electro-optic modulator in the first direction; and
a projection optical system that projects the light modulated by the electro-optic modulator.

2. A projector comprising:
an illumination device including:
    a light source device having a paraboloidal reflector and a light emitting tube having a center of light emission near a focus of the paraboloidal reflector,
    a first lens array having plural first small lenses for dividing an illumination beam emitted from the light source device into plural partial beams,
    a second lens array having plural second small lenses corresponding to the plural first small lenses of the first lens array, and
    a superposition lens for superposing the partial beams emitted from the plural second small lenses in an area to be illuminated;
an electro-optic modulator that modulates the illumination beam from the illumination device according to image information, each first small lens in the first lens array has a plane shape compressed in a direction which is either longitudinal or lateral direction forming the illumination beam emitted from the illumination device into an illumination beam having a sectional shape as to illuminate a part of an image forming area in a first direction in the image forming area of the electro-optic modulator, and to illuminate the whole of the image forming area in a second direction;
a light cut-off member that is arranged in a position which is optically conjugate with the plural first small lenses and the elector-optic modulator between the illumination device and the electro-optic modulator, and has a predetermined opening part for adjusting the sectional shape of the illumination beam, the width of the predetermined opening part at a central portion being narrower than the width at both ends of the opening part;
a rotating prism that is arranged on the electro-optic modulator side of the light cut-off member, and scans the illumination beam from the light cut-off member, in synchronization with a frame rate of the electro-optic modulator, on the image forming area of the electro-optic modulator in the first direction; and
a projection optical system that projects the light modulated by the electro-optic modulator.

3. The projector according to claim 1, wherein the light emitting tube is provided with an auxiliary mirror that reflects the light emitted from the light emitting tube to the side of the area to be illuminated, toward the light emitting tube.

4. The projector according to claim 2, wherein the light emitting tube is provided with an auxiliary mirror that reflects the light emitted from the light emitting tube to the side of the area to be illuminated, toward the light emitting tube.

5. The projector according to claim 1, wherein the light emitting tube is arranged on an illumination optical axis of the illumination beam emitted from the light source device, and the plural first small lenses are arranged symmetrically with an up-and-down direction and a left-and-right direction so that the illumination optical axis becomes a center axis.

6. The projector according to claim 2, wherein the light emitting tube is arranged on an illumination optical axis of the illumination beam emitted from the light source device, and the plural first small lenses are arranged symmetrically with an up-and-down direction and a left-and-right direction so that the illumination optical axis becomes a center axis.

7. The projector according to claim 1, wherein the light emitting tube is arranged on an illumination optical axis of the illumination beam emitted from the light source device, and the plural first small lenses arranged in the central portion in the first direction are arranged in an even number of rows along the second direction.

8. The projector according to claim 2, wherein the light emitting tube is arranged on an illumination optical axis of the illumination beam emitted from the light source device, and the plural first small lenses arranged in the central portion in the first direction are arranged in an even number of rows along the second direction.

9. The projector according to claim 1, comprising:
a color-separation and light-guide optical system that is arranged between the rotating prism and the electro-optic modulator, and separates the illumination beam from the rotating prism into plural color lights;
the electro-optic modulator modulating the plural color lights emitted from the color-separation and light-guide optical system according to image information corresponding to the plural color lights; and
a cross dichroic prism which synthesizes the plural color lights modulated by the electro-optic modulator.

10. The projector according to claim 2, comprising:
a color-separation and light-guide optical system that is arranged between the rotating prism and the electro-optic modulator, and separates the illumination beam from the rotating prism into plural color lights;
the electro-optic modulator modulating the plural color lights emitted from the color-separation and light-guide optical system according to image information corresponding to the plural color lights; and
a cross dichroic prism which synthesizes the plural color lights modulated by the electro-optic modulator.

* * * * *